No. 669,975. Patented Mar. 19, 1901.
M. BERTELS.
DEVICE FOR RETAINING TABLE CLOTHS, &c., IN POSITION.
(Application filed Mar. 23, 1900.)
(No Model.)
Fig. 2. 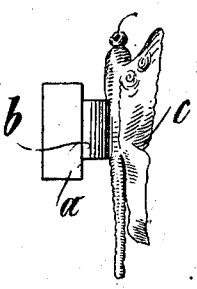   Fig. 1. 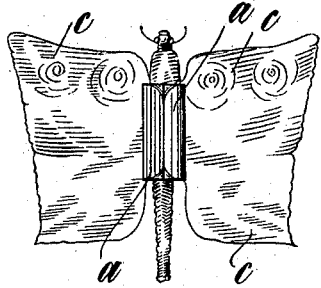   Fig. 3. 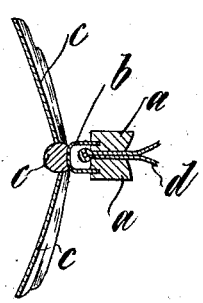
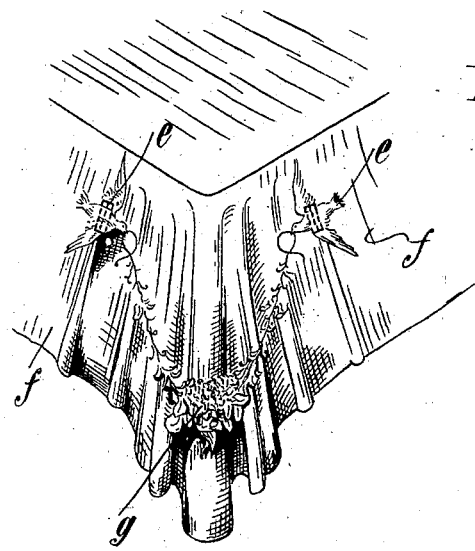
Fig. 4.
Witnesses:
Inventor:

UNITED STATES PATENT OFFICE.

MARIE BERTELS, OF BERLIN, GERMANY.

DEVICE FOR SECURING TABLE-CLOTHS, &c., IN POSITION.

SPECIFICATION forming part of Letters Patent No. 669,975, dated March 19, 1901.

Application filed March 23, 1900. Serial No. 9,948. (No model.)

*To all whom it may concern:*

Be it known that I, MARIE BERTELS, a subject of the German Emperor, residing at Berlin, Germany, have invented new and useful Improvements in Devices for Weighting Table-Cloths and the Like for the Purpose of Retaining Them in Position, of which the following is a specification.

The present invention relates to an improved device for weighting table-cloths and the like for the purpose of securing them in position.

The device is fitted in such a manner that it not only retains the table-cloth in its position, but serves at the same time as an ornamentation.

Referring to the accompanying drawings, which illustrate my invention, Figure 1 is a rear elevation of the improved device; Fig. 2, a lateral elevation of same. Fig. 3 illustrates a horizontal section through Fig. 1, and Fig. 4 shows a modified way of carrying into practice the principle of my invention in its application to a table-cloth.

My improved device essentially consists of two wooden cheeks $a a$, connected and pressed together by means of a spring $b$. On this spring $b$ is fitted a weighted representation of a butterfly $c$, made suitably of metal or other heavy material. A bird, flower, or other ornamentation may take the place of the butterfly, said butterfly, bird, flower, or other ornamentation serving for covering the device, so that the latter is invisible from outside. The cheeks $a a$ are suitably rounded off at their free extremities in order to prevent damaging the table-cloth which is to be clamped between them.

The device is employed in the following manner: The table-cloth $d$ is inserted between the two cheeks $a a$, where it is retained owing to the action of the spring $b$, which presses the two cheeks together. The weight of the device $c$ prevents the table-cloth from being blown off by the wind or dislocated.

The device may also be employed in the manner illustrated in Fig. 4, in which two clamps covered by birds $e e$ are secured at either side of the table-cloth $f$ near to the table, while a third clamp covered by a floral ornamentation $g$ is secured to the table-cloth $f$ between the two birds $e e$, but lower down. It may be advantageous to connect the clamp $g$ with the two birds $e e$ by a garland of natural or artificial flowers, so as to form a tasteful ornamentation.

It is obvious that I do not limit myself to a certain number of clamps to be employed with one table-cloth and that the ornamentation of the device may vary according to requirements or taste without departing from the spirit of the invention.

What I claim as new, and desire to secure by Letters Patent, is—

A device for retaining table-cloths and the like in position comprising, in combination two wooden cheeks, an arched spring, having its ends inserted in and adapted to press the aforesaid cheeks together, and a weighted ornamental design attached to the curved portion of the spring adapted to cover same and the cheeks so as to render the clasp invisible, substantially as described and shown.

In testimony whereof I have hereunto set my hand in presence of two subscribing witnesses.

MARIE BERTELS.

Witnesses:
 WOLDEMAR HAUPT,
 HENRY HASPER.